United States Patent
Benlloch Baviera et al.

(10) Patent No.: US 12,078,766 B2
(45) Date of Patent: Sep. 3, 2024

(54) DEVICE FOR THE DETECTION OF GAMMA RAYS WITH INTERACTION DEPTH AND TIME-OF-FLIGHT ENCODING

(71) Applicants: UNIVERSITAT POLITECNICA DE VALENCIA, Valencia (ES); CONSEJO SUPERIOR DE INVESTIGACIONES CIENTIFICAS (CSIC), Madrid (ES)

(72) Inventors: Jose Maria Benlloch Baviera, Valencia (ES); Antonio Javier Gonzalez Martinez, Valencia (ES); Victor Ilisie, Valencia (ES); John Barrio Toala, Valencia (ES); Efthymios Lamprou, Valencia (ES)

(73) Assignees: UNIVERSITAT POLITECNICA DE VALENCIA, Valencia (ES); CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 190 days.

(21) Appl. No.: 17/793,818

(22) PCT Filed: Jan. 20, 2021

(86) PCT No.: PCT/ES2021/070031
§ 371 (c)(1),
(2) Date: Jul. 19, 2022

(87) PCT Pub. No.: WO2021/148694
PCT Pub. Date: Jul. 29, 2021

(65) Prior Publication Data
US 2023/0055050 A1  Feb. 23, 2023

(30) Foreign Application Priority Data
Jan. 20, 2020 (ES) .............................. ES2020030038

(51) Int. Cl.
*G01T 1/20* (2006.01)
*G01T 1/202* (2006.01)

(52) U.S. Cl.
CPC ............ *G01T 1/2018* (2013.01); *G01T 1/202* (2013.01)

(58) Field of Classification Search
None
See application file for complete search history.

(56) References Cited

U.S. PATENT DOCUMENTS

| 7,475,864 B2 | 1/2009 | Benlloch Baviera |
| 10,203,419 B2 | 2/2019 | Frazao |

(Continued)

FOREIGN PATENT DOCUMENTS

| JP | S5981575 A | 11/1984 |
| JP | H01202684 A | 8/1989 |
| WO | 2008142590 A2 | 11/2008 |

OTHER PUBLICATIONS

K. Doroud, "A new approach for improved time and position measurements for TOF-PET: Time-stamping of the photo-electrons using analogue SiPMs", Journal, 2017, 16-19, vol. 849, Nuclear Instruments and Methods in Physics Research A.

(Continued)

*Primary Examiner* — Edwin C Gunberg
(74) *Attorney, Agent, or Firm* — Hayes Soloway P.C.

(57) ABSTRACT

A device for the detection of gamma rays presents a high resolution in the three-dimensional position of the impact of the gamma ray within one or more scintillation crystal blocks coupled to an array of photosensors, for the determination of the impact energy of said gamma ray, the determination of the instant in time when said impact occurred, the interaction depth and the determination of the time-of-flight. Advantageously, in said device, the scintillation crystal detection blocks are optically isolated, in such a (Continued)

way that the scintillation light can only exit said blocks via the output region; and the scintillation crystal detection blocks and the array of photosensors are disposed in direct optical coupling.

15 Claims, 5 Drawing Sheets

(56) References Cited

U.S. PATENT DOCUMENTS

| | | | | |
|---|---|---|---|---|
| 2011/0215248 | A1* | 9/2011 | Lewellen | A61B 6/037 250/363.03 |
| 2014/0021354 | A1* | 1/2014 | Gagnon | G01T 1/208 250/362 |
| 2014/0353511 | A1* | 12/2014 | Clonts | G01T 3/06 250/361 R |
| 2018/0292548 | A1* | 10/2018 | Zhang | G01T 1/2985 |
| 2023/0041293 | A1* | 2/2023 | Palm | A61N 5/1071 |

OTHER PUBLICATIONS

Efthymios Lamprou, "Exploring TOF capabilities of PET detector blocks based on large monolithic crystals and analog SiPMs", Journal, 2020, 10-18, vol. 70, Physica Medica.

Andrea Gonzalez-Montoro, "Detector block performance based on a monolithic LYSO crystal using a novel signal multiplexing method", Journal, 2018, 372-377, vol. 912, Nuclear Instruments and Methods in Physics Research A.

Qing Ye, "A high sensitivity 4(pi) view gamma imager with a monolithic 3D position-sensitive detector", Journal, 2019, 31-40, vol. 937, Nuclear Instruments and Methods in Physics Research A.

* cited by examiner

DEVICE FOR THE DETECTION OF GAMMA RAYS WITH INTERACTION DEPTH AND TIME-OF-FLIGHT ENCODING

CROSS-REFERENCE TO RELATED APPLICATIONS AND PRIORITY

This patent application claims priority from PCT Application No. PCT/ES2021/070031 filed Jan. 20, 2021, which claims priority from Spanish Patent Application No. P202030038 filed Jan. 20, 2020. Each of these patent applications are herein incorporated by reference in their entirety.

FIELD OF THE INVENTION

The present invention is comprised in the technical field relative to imaging by means of gamma rays. More specifically, the invention relates to the design of devices for the detection of gamma radiation to obtain information about a source, for example, nuclear imaging medical devices, such as gamma cameras, positron emission tomography (PET) equipment or single photon emission computed tomography (SPECT) equipment, among others. The devices according to the invention allow to be determined with a high resolution both the three-dimensional position (3D) and the impact time of a gamma ray in a detector such as a scintillator crystal. The invention is preferably applicable to the manufacture of scanners, such as PET scanners or PET probes.

BACKGROUND OF THE INVENTION

Current scanners based on positron emission tomography (PET) are used in multiple clinical applications which include, primarily, the diagnosis and monitoring of cancer. Radiopharmaceuticals, i.e., molecules specific for the diagnosis of a disease, are used in the PET technique (in the case of cancer, glucose is mostly used given its higher absorption by tumours), together with positron-emitting isotopes (fundamentally, fluorine-18 ($^{18}F$)) acting as radiotracers, for tracking thereof in the body being imaged. Once in the body, the radiopharmaceutical accumulates in the areas of the highest absorption and the isotope emits positrons which are rapidly annihilated when they encounter electrons from the body, simultaneously generating two gamma rays in the same direction, but in opposite ways. Time-coincident detection of the two gamma rays, e.g. by means of a ring of detectors or by means of pairs of facing detection panels (placed on both sides of the organ to be examined), makes it possible to discriminate true events from random background noise. More recently, the most advanced PET scanners make it possible to measure the arrival time of the two gamma rays at these detectors, with sufficient temporal resolution to determine, within a margin of error, the position within the body where the annihilation of the positron emitted with the electron has occurred. This characteristic is essential for the improvement of the signal-to-noise ratio and, accordingly, of the sensitivity and quality of the clinical image. In this respect, PET scanners based on scintillation crystals are currently of great interest because of their potential for improvement due to the determination of the time-of-flight of the gamma rays with a higher resolution.

Scintillation crystals can be continuous or pixelated. Most gamma ray detector designs use pixelated crystals with a smaller scintillation crystal size, since these crystals define the spatial resolution both of the detector and of the scanner that may be obtained. These scintillation crystals must always have a significant thickness so as to ensure that a high percentage of gamma particles interacts with said crystal.

The required thickness of the scintillation crystals involves an indeterminacy in the depth of interaction (DOI) of the gamma ray along said crystals. Thus, the two directions defining an array of photosensors are usually not sufficient to determine the line of incidence of the gamma ray. Not knowing the position of the gamma ray interaction along the perpendicular to the input face of the scintillation crystal (DOI) prevents distinguishing between possible lines that do not have the same angle of incidence, or that interact at different depths of the crystal, resulting in a parallax error. Accordingly, the greater the thickness of the crystal, the greater the parallax error.

To minimise this parallax error, the angle of incidence or depth of interaction of the gamma ray must be known. With current techniques for the detection of gamma rays, it is completely impossible to measure said angle of incidence in any way, so the depth of interaction must necessarily be determined with a certain measurement error. In addition, the parallax error becomes more important the higher the energy of the gamma ray, since thicker scintillation crystals are needed to record a high percentage of gamma radiation.

There are detectors based on continuous scintillation crystals (for example, J. M. Benlloch et al., "Gamma Ray Detector with Interaction Depth Coding", U.S. Pat. No. 7,476,864 B2), which use the width of the distribution of scintillation light to determine depth of interaction. To that end, these detectors utilise the fact that the scintillation light is distributed isotropically, which leads to different densities of light along the reading faces where photodetectors are positioned. As a result, a distribution of scintillation light the width of which allows the depth of interaction of the gamma ray to be deduced is obtained.

In large scanners (>50 cm in diameter), the resolution in determining the DOI is not so important, as they do not produce a significant parallax error. However, when detectors are very close to the patient, as in the case of more specialised equipment (scanners dedicated to the detection of breast cancer, the brain, small animals), a more precise determination of the depth of interaction is required to avoid a significant parallax error.

A known method to obtain the depth of interaction in pixelated crystals is based on the use of a diffusing layer on the gamma ray inlet surface ("Detector component for an x-ray or gamma ray detector", U.S. Pat. No. 10,203,419 B2). If the gamma ray interaction occurs close to the array of photosensors, very little light passes through the diffusing layer to adjacent crystals. Conversely, if the interaction occurs close to the diffusing layer, the light passing through same to adjacent pixels will be sufficient. This property can be used for the determination of the depth of interaction of the gamma rays in the crystal. There are also variations on this idea in the state of the art.

In relation to temporal resolution, good performance can be obtained with gamma ray detectors by means of pixelated crystals with "one-to-one" coupling, i.e., where the size of the scintillation pixel and that of the photosensor are the same, ensuring that all the scintillation light produced in the crystal is captured by a single photosensor (except for losses in the coupling).

The difficulty with continuous crystal approaches is that the time determination of the interaction of the gamma ray is more complex, mainly because many photosensors are illuminated (receive optical photons) by each interaction of a gamma ray. Therefore, in order to correctly determine the time, the event trigger must be lowered considerably, since each photosensor usually receives a small fraction of the scintillation light produced. In addition, each photosensor receives a different amount of scintillation light for each gamma ray. This results in a time dependence for each photosensor and for each measured amount of scintillation light. This can be considered and partially corrected by what is known as "walk-time" correction (E. Lamprou, NIM-A 912, 132, 2018; E. Lamprou, Physica Medica, doi: org/10.1016/j.ejmp.2019.12.004).

The present invention is intended to overcome the limitations of known detectors by means of a novel device for the detection of gamma rays, which has a high resolution in the determination of the energy of the gamma ray, the projection of the position of the impact of the gamma ray on the plane of the photodetectors, the time instant at which the impact occurred, the depth of interaction and the time-of-flight.

BRIEF DESCRIPTION OF THE INVENTION

In light of the problems in the state of the art set forth in the previous section, the present invention proposes a high-resolution device for the detection of gamma rays, preferably comprising the following elements:

One or more scintillation crystal blocks, for example in the form of a rectangular prism or truncated wedge, preferably constituted in turn by several elongated scintillation crystal sheets having the same shape (i.e., preferably a rectangular or truncated wedge shape, although without any limitation to geometries of another type) and joined together by their largest faces, being arranged consecutively on an array of photosensors. Although reference is primarily made herein to a disposition of scintillation crystal sheets on the array of photosensors, it should not be interpreted as being limited to an up-down orientation, but rather it refers only to a relative orientation. That is, any other spatial orientation of the blocks having a relative disposition of the crystal sheets on the array of photosensors will likewise be considered comprised within the scope of interpretation of the invention. Likewise, the mentioned disposition shall also comprise those situations wherein there is one or more auxiliary scintillation crystal elements (such as blocks, sheets or pixels), disposed between the assembly of scintillation crystal sheets and the array of photosensors, or on the scintillation crystal sheets.

The length $L_Y$ of the sheets in direction (y) parallel to the array of photosensors is much longer than the length $L_X$ of the sheets in direction (x) perpendicular to the sheets and longer than the length $L_Z$ in direction (z) perpendicular to the array of photosensors, i.e., $L_Y \gg L_X$, $L_Y > L_Z$. Preferably, $L_X$ is equal to or less than the size of the pixel of the photosensor in direction (x).

An array of photosensors, preferably silicon photomultipliers (SiPM), located on the face of the scintillation crystal block or blocks, opposite the gamma ray input face in the detector. On one hand, said array allows the identification of the scintillation crystal sheet where the impact of the gamma ray occurred and the position of the impact in the direction of the sheet (y) by means of the distribution of light in the array of photosensors, as well as the depth of interaction of the gamma ray in the scintillation crystal block. In the case of using SiPM photosensors, the number of these cells in the present invention is around or somewhat less than twice the expected number of optical photons detected in said photosensor, for the energy of the gamma rays intended to be detected.

In general, each SiPM (pixel of the array of photosensors) consists of microcells (e.g., Single-Photon Avalanche Diodes, or SPADs). When a microcell detects a photon, it is not able to detect a second photon arriving at it for a dead time much longer, in general, than the light emission time of the scintillation material. Therefore, to preserve the linearity of the response as a function of gamma ray energy, it is important for the number of microcells to be such that it is far from saturation by the emitted scintillation photons. The number of microcells in each SiPM photosensor should preferably be more than twice the number of scintillation photons expected so that the saturation phenomenon is not significant and thus preserve linearity in energy. Typically, SiPMs have microcells between 10 µm and 100 µm in size. SiPMs with smaller microcells usually have a larger number of microcells. For example, there are 1600 microcells of 25 µm per mm$^2$, and only 100 microcells of 100 µm per mm$^2$. However, each microcell necessarily has a dead area around it to isolate it from neighbouring microcells, so if the number of microcells is very large, the total sensitive area of the photosensor decreases. Therefore, in order to maximise the number of photons detected, it is important for the number of microcells not to be excessively large, being at the limit of energy linearity. The determination of the energy should desirably have an acceptable linearity up to, but not beyond, the energy of the gamma rays to be detected (511 keV in the case of PET). Said linearity is necessary in order to distinguish gamma rays which interact due to a photoelectric effect in the scintillation crystal block, depositing all their energy therein, from those which produce a Compton interaction and therefore do not deposit all their energy in the scintillation block. In conclusion, a feature of the present invention is that the number of microcells of each SiPM photosensor is around or somewhat less than twice the expected number of scintillation photons detected in said photosensor and for the energy of the gamma ray. If $<N\gamma>$ is used to refer to the expected number of detected photons per unit area (mm$^2$) and for the energy of the gamma rays to be detected, and $N_{cells}$ is used to refer to the number of microcells per unit area (mm$^2$), the condition $N_{cells} \lesssim <N\gamma>$ is arrived at. The expected number of detected scintillation photons will depend on the configuration of the selected scintillation crystal block, i.e., the size of the sheets $L_x$ and $L_y$, and the type of SiPM. For large $L_x$, such as those that might be used in clinical PET scanners, it may be advantageous to use microcells in the order of 75 µm. For small experimental animal scanners, where maximum spatial resolution is required, $L_x$ should be smaller in size and it is optimal to use microcell sizes in the order of 50 µm.

A direct optical coupling (preferably without using diffusing sheets, light guides, or equivalent elements) between the scintillation crystal blocks and the photosensors. Said coupling is performed via, for example, a thin layer of grease, optical silicone or Optical Clear Adhesive (OCA) films, among others, having an intermediate refractive index between the scintillation crystal and the input surface of the photodetectors. The thickness of said layers or films has a value substantially equal to or less than 0.25 mm. This characteristic is critical for obtaining good temporal resolution.

A retroreflective or Enhanced Specular Reflector (ESR) type film on the gamma ray input surface in the detection device (i.e., on the face opposite the array of photosensors) and preferably covering the region of the scintillation crystal block or blocks on said input surface.

One or more reflective thin films (preferably having a thickness substantially equal to or less than 0.25 mm), covering all the side surfaces of the block, completely passing over not only the crystal block but also the associated photosensors. The use of said reflective sheets allows the detection block of the outer or of other blocks of the device to be optically isolated. In different embodiments of the invention, the scintillation crystal sheets can be separated by said reflective thin films, providing a partial or complete optical isolation between same, in the inner volume of the detection block.

Optionally, a reflective grid located in the non-active areas of the array of photosensors, so that the light that would be lost (corresponding to the "dead area" of the array) is returned to the scintillator crystal and, eventually, to a photosensor. On one hand, photosensors (mostly having a square cross-section) generally have a "dead area", i.e., insensitive to light, at the edges. Advantageously, according to the approach of the invention, said dead area of the array of photosensors is covered by a grid of reflective material, so that photons that would otherwise be lost in the scintillation crystal block are reintroduced, allowing their further detection after at least one reflection on the walls of the block. By adding the mentioned reflective surface, the possible loss of light in the non-active area between photosensors is partially or fully recovered.

Associated electronics and/or computational means which allow to calculate, in addition to the energy of the gamma ray and the position of its interaction in the crystal, the depth of interaction therein from the distribution of scintillation light. The time component of each block is obtained via the associated electronics, which will also allow the signal from all the photosensors to be added together.

More preferably, a first object of the invention relates to a device for the detection of gamma rays according to any of the embodiments described herein, comprising a plurality of scintillation crystal detection blocks disposed on an array of photosensors, wherein said array comprises a plurality of rows and a plurality of columns, and wherein said detection blocks:

comprise a plurality of elongated scintillation crystal sheets, in the form of rectangular prisms or truncated wedges, which are disposed consecutively on said array of photosensors, wherein said scintillation crystal sheets define a gamma ray input region and a scintillation light output region, in such a way that the scintillation light can be detected by the array of photosensors;

are optically isolated, in such a way that the scintillation light can only exit said blocks via the output region;

wherein the scintillation crystal detection blocks and the array of photosensors are disposed in direct optical coupling;

and wherein the device comprises electronic means connected to the array of photosensors, configured to record the reading information from said photosensors, and to process and/or analyse said information.

As mentioned in the scope of the present invention, "direct optical coupling" existing between the scintillation crystal blocks and the array of photosensors shall be understood to mean a coupling such that the distance between the corresponding elements thereof is less than 0.25 mm (for example, via a thin film of optical grease, OCA, etc., and preferably having a refractive index between the scintillation crystal and the array of photosensors, for example comprised between 1.25 and 2.25). Said direct optical coupling therefore excludes the use of diffusing sheets, light guides, or the like between the scintillation crystal sheets and the array of photosensors.

Advantageously, in the device of the invention:

the array of photosensors is at least partially disposed such that it is shared between said detection blocks, and the electronic means connected to the array are configured to record a plurality of integrated detection signals, corresponding to the sum of signals generated by each row and by each column of the array of photosensors, and to record a set of timestamps associated with each of the integrated detection signals along an axis formed by the disposition of detection blocks.

A second object of the invention relates to a method for the detection of gamma rays, where said method comprises performing the following steps by means of a device according to any of the embodiments described herein:

recording, with the electronic means connected to the array of photosensors, a plurality of integrated detection signals, corresponding to the sum of signals generated by each row and by each column of said array of photosensors;

recording, with the electronic means connected to the array of photosensors, a set of timestamps associated with each of the integrated detection signals along an axis formed by the disposition of detection blocks; and determining, with the mentioned electronic means, the impact time of the gamma rays in the detection blocks, the impact energy of the gamma rays, the projection of the position of said impact on the array of photosensors and/or the depth of interaction of said gamma rays from the integrated detection signals and their corresponding timestamps.

Likewise, in the scope of the present invention, the term "substantially" shall be understood to mean identical or comprised in a range of ±15% variation.

As a result of the elements described in the preceding paragraphs, the present invention optimises resolution in the determination of the interaction time of each gamma ray (temporal resolution) by means of a design of a detection block which maximises the number of photons detected, therefore producing a more intense electronic signal.

DESCRIPTION OF THE DRAWINGS

The above and other features and advantages will be more fully understood from the detailed description of the invention as well as from the preferred embodiments in relation to the attached figures, which are described in the paragraphs following.

REFERENCE NUMBERS USED IN THE DRAWINGS

| | |
|---|---|
| (1) | Scintillation crystal detector block |
| (2) | Array of photosensor elements |
| (2') | Reflective grid on the array of photosensors |
| (3) | Scintillation crystal sheets |
| (4) | Scintillation light output surface/face |
| (5) | Depth of interaction (DOI) |
| (6) | Retroreflective (or ESR) film |
| (7) | Gamma radiation input surface/face |
| (8) | Reflective film |
| (9) | Side windows |
| (10) | Auxiliary scintillation crystal elements |
| (11) | Scintillation crystal pixels |

DETAILED DESCRIPTION OF THE INVENTION

A detailed description of the invention is set forth below in reference to different preferred embodiments thereof, based on FIGS. 1A-12 of the present document. Said description is provided for purposes of illustrating but not limiting the claimed invention.

As described in the preceding sections, the main object of the present invention is a device for the detection of gamma rays, presenting a high resolution in the determination of both the energy of the gamma ray and the three-dimensional position of the impact of the gamma ray within the scintillation crystal block, as well as in the determination of the instant in time when said impact occurred. As described in the preceding sections, is required in PET-based detectors the detection of two gamma rays that have been emitted at the same time and from the same position, with the same direction, but in opposite ways. Furthermore, the determination of the instant of the impact of both rays by means of detectors located in opposite positions with respect to the emitter, which allows the determination of the relative time-of-flight (TOF) between both gamma rays and, therefore, the estimation of the emission position along said direction, is also required.

The device for the detection of gamma rays of the present invention preferably consists of (FIG. 1A) an assembly of scintillation crystal detection blocks (1), disposed on a surface covered by an array (2) of photosensor elements. In one of the preferred embodiments of the invention, the array (2) of photosensors comprises a plurality of silicon photomultipliers (SiPM).

Figure 1A:
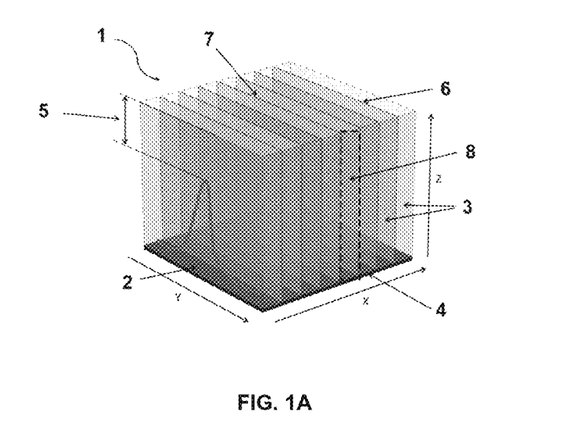
FIG. 1A. Depiction of the scintillation crystal sheets coupled to the photosensor of the device, with an example of the distribution of light and the depth of interaction.
Figure 1B:
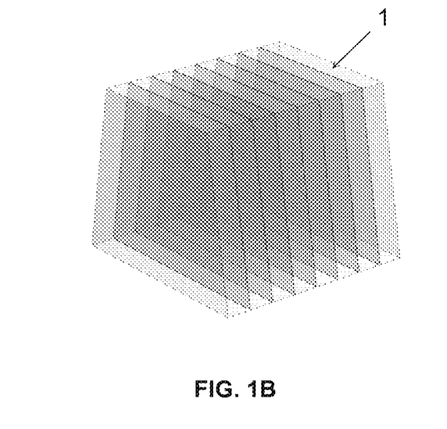
FIG. 1B. Depiction of a disposition of scintillation sheets in the form of a truncated wedge in direction Y.

Each scintillation crystal block (1) comprises several thin scintillation crystal sheets (3) (for example, in the form of rectangular prisms or truncated wedges, as shown in FIGS. 1A and 1B), respectively, joined together by their largest faces. The scintillation light is mostly directed towards one of their two thinnest faces (hereinafter referred to as output region (4)), which is disposed on the array (2) of photosensor elements.

In the scope of the present invention, the direction perpendicular to the sheets (3) shall be referred to as (x), the direction parallel to the sheets (3) (in the direction of the longest dimension thereof) shall be referred to as (y), and "main direction" perpendicular to both aforementioned axes (x, y) shall be referred to as (z), as shown in FIG. A1. The array (2) of photosensors is located on the side opposite the input side of the gamma rays, on the x-y plane, i.e., the plane of the sheets (3) is disposed substantially perpendicular (vertical) to the plane of the array (2) of photosensors, but the main (elongated) direction thereof is parallel to the plane of said photosensors. The dimensions of each sheet (3) shall be referred to as $L_X$, $L_Y$, and $L_Z$. Likewise, as shown in FIG. 1A, the point of interaction of the gamma ray along direction z is referred to as depth of interaction (5), or "DOI".

The sheets (3) preferably have an elongated shape in the direction parallel to the plane of the sheets and to the plane of the array (2) of photosensors, i.e., with a dimension that is clearly larger than the others ($L_Y$>>$L_X$, $L_Y$>$L_Z$). These sheets shall be referred to as "vertical" sheets, in contrast with sheets parallel to the array (2) of photosensors, which shall be referred to as "horizontal" sheets. Therefore, another way to describe the present invention consists of the blocks (1) having several vertical elongated sheets (3).

Another preferred feature of the present invention consists of, in direction (y) (parallel to the sheets (3)), there being a number of photosensors optically coupled to said sheets (3), so as to obtain samples of the distribution of light along said direction (y), for the purpose of not only determining, with good resolution, the position of the impact of the gamma ray along said direction (y), but also determining the DOI (5). Likewise, the position of the impact of the gamma ray in direction (x) perpendicular to the sheets (3) is determined by the identification of the sheet (3) in which most of the light is produced.

Another feature of the present invention consists of the width of the scintillation crystal sheets (3), at the narrowest part thereof, preferably being less than or equal to the width of the array (2) of photosensors, as shown in FIG. 1A.

Another feature of the present invention consists of not using light diffusing sheets, light guides, or the like, for the purpose of maximising direct light reaching the array (2) of photosensors, preventing losses due to a change in refractive index and, therefore, optimising temporal resolution. Moreover, the number of photosensors that receive light from a sheet in direction (x) is also thereby minimised. To that end, and as described above, the scintillation crystal blocks (1) and the array (2) of photosensors are disposed in "direct optical coupling", i.e., with a coupling such that the distance between same is preferably less than 0.25 mm (for example, via a thin film of optical grease, OCA, etc., and preferably having a refractive index between the scintillation crystal and the array of photosensors, for example comprised between 1.25 and 2.25). Said direct optical coupling therefore excludes the use of diffusing sheets between the scintillation crystal sheets (3) and the array (2) of photosensors.

Another feature of the present invention consists of the use of a retroreflective (or ESR) sheet (6), preferably located on the surface where the gamma rays enter the scintillation crystal block (1) (i.e., on the surface opposite the surface of the photosensors), for the purpose of maximising the amount of light detected by the photosensors, but maintaining the manner of distribution of light directly reaching same. Said distribution of light allows not only the determination of the position of interaction of the gamma ray along the sheet (in direction (y)), but also the position (z) or the depth of interaction (5) of the gamma ray along the direction of the gamma rays within the block (1). Such distribution of light is converted into in a distribution of charge, currents or voltage by each photosensor, and for each detection block (1), this information will preferably be processed by processing means adapted for this purpose, such as a circuit board, a field-programmable gate array (FPGA) type processor or the like.

Each of the outer surfaces of the detection blocks (1) and, therefore, of the outer scintillation crystal sheets (3) are covered by one or more optically isolating elements, in such a way that the scintillation light can only exit said detection blocks (1) via the output region of the scintillation light, where the photosensors are located. Likewise, and optionally, the scintillation crystal sheets (3) can be internally separated in the block (1) by means of a reflective film (8) such as, for example but not limited to ESR, white paint or Teflon, to maximise the light gathered by the photosensors and to isolate the sheets (3) of the block (1) from other adjacent sheets. In a preferred embodiment of the invention, said reflective films (8) completely cover not only the surface of the crystal sheet (3) but are prolonged, partially or completely going through the array (2) of photosensors, in order to optically isolate each crystal sheet (3) and their detection assemblies with respect to the adjacent sheets (3), maximising the amount of light detected and, therefore, improving temporal features.

Figure 2A:
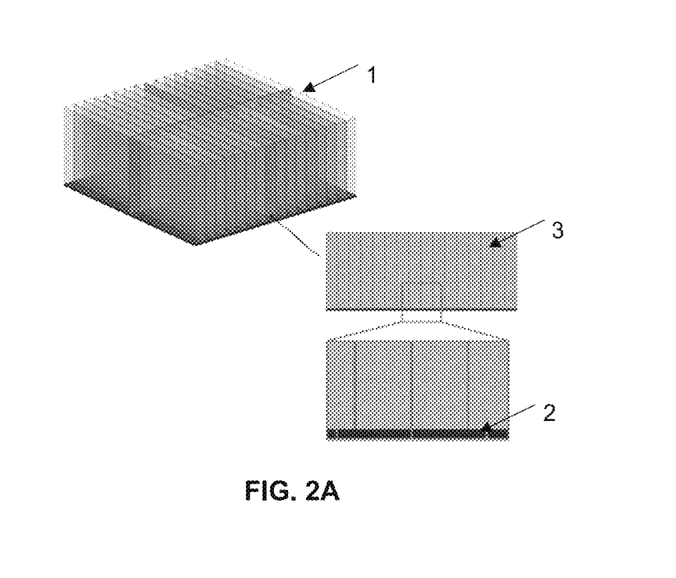
FIG. 2A. Left: depiction of a detection module consisting of several scintillation crystal blocks optically isolated from one another. Right: detail of the insertion of an opaque but reflective film, to avoid losses of light between blocks (see arrows). The opaque film passes over the surface of the array of photosensors, being introduced therein.
Figure 2B:
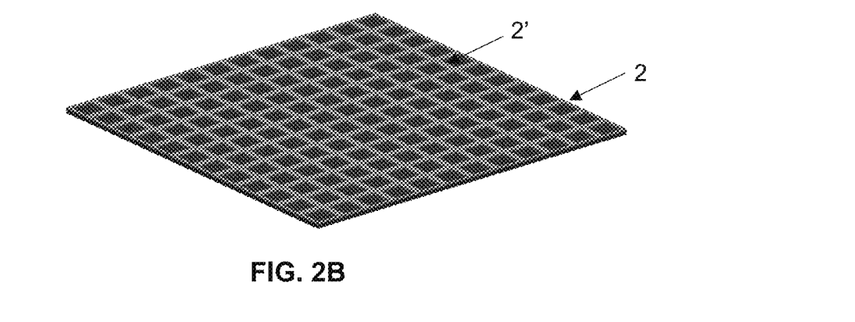
FIG. 2B. Detail of the reflective grid on the array of photosensors.

Each assembly consisting of an assembly of scintillation crystal sheets (3) together with the array (2) of light reading photosensors and their associated electronics shall be referred to as "detection module". Several detection modules (and therefore several detection blocks (1)) can be joined together and partially share the measurement electronics, forming an enlarged detection module. An example of this possibility is shown in FIG. 2A, where four detection modules that are part of the device for the detection of gamma rays can be seen (left). The detail view of the mentioned figure (right) shows how certain assemblies that are part of the measurement electronics in the array (2) of photosensors are applied simultaneously to four different blocks (1). Likewise, a detail of the array (2) of photosensors according to a preferred embodiment of the invention can be seen in FIG. 2B, wherein said array (2) incorporates a reflective grid (2') on the array of photosensors.

Figure 3:
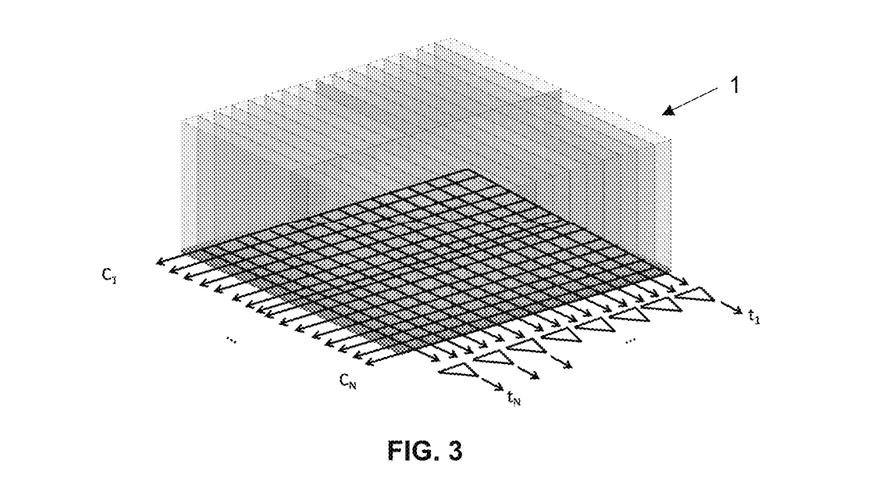
FIG. 3. Depiction of the electronics associated with each detector block, providing information about the total charge (or current, or voltage) along each row of photosensors and each column of photosensors on the perpendicular axis. The signal of all the photosensors of the block is added together to determine the interaction time.

A further object and a preferred embodiment of the present invention comprises the use of an electronics board which allows each row and each column of photosensors of the detection module to be read, integrating the values of said rows and columns (FIG. 3). In directions X and Y (parallel to the array of photosensors), the charge ($C_1$, ..., $C_N$) (or the current or the voltage) for each row and column of photosensors of the detection block is determined. Moreover, all the signals corresponding to all the photosensors of the block (1) are analogically added together in order to integrate all the light belonging to same and thus provide an optimal measurement of time t. Before determining the temporal information, the form of the signals is preferably optimised by means of the electronics board, which reduces the capability of the photosensors, for the purpose of minimising the rise time and therefore improving temporal resolution. Additionally, in a preferred embodiment of the invention, said board or another attached board, has processing means (for example, an FPGA type processor) to perform certain calculations, such as energy, time, position (x, y), and depth of interaction.

Therefore, in a preferred embodiment of the gamma ray detector of the invention, said detector comprises the following structural elements:

One or more scintillation crystal blocks (1) in the form of a rectangular prism or truncated wedge, preferably constituted in turn by several elongated scintillation crystal sheets (3) having the same shape (i.e., rectangular or in the form of a truncated wedge) and joined together by their largest faces, being arranged consecutively on an array (2) of photosensors. Likewise, the length $L_Y$ of the sheet (3) in direction (y) parallel to the array (2) of photosensors is much longer than the length $L_X$ of the sheet in direction (x) perpendicular to the sheets and longer than the length $L_Z$ in direction (z) perpendicular to the array of photosensors, i.e., $L_Y \gg L_X$, $L_Y > L_Z$. $L_X$ is less than the size of the pixel of the photosensor in direction (x).

A retroreflective or ESR sheet (6) on the surface of the face opposite the array (2) of photosensors, preferably covering at least the entire scintillation crystal block (1).

An array (2) of photosensors, preferably silicon photomultipliers (SiPM), located on the face of the scintillation block or blocks (1), disposed on the scintillation light output face (4) (opposite the gamma ray input face). This array will preferably contain a grid (2') made of reflective material (ESR, white paint, etc.) coupled to the inactive zone. Said array (2) of photosensors allows, on one hand, the identification of the scintillation crystal sheet (3) where the impact of the gamma ray occurred and the position of the impact in the direction of the sheet by means of the distribution of light in the array (2) of photosensors, as well as the depth of interaction (5) of the gamma ray in the scintillation crystal block (1).

The number of the microcells of each photosensor SiPM is substantially equal to or less than twice the expected number of scintillation photons detected in said photosensor and for the energy of the gamma rays to be detected. In the case of PET detectors and LYSO crystals, 50 μm microcells will be used for thin sheets and 75 μm microcells will be used for thicker sheets. For crystals with little light emission, such as BGO crystals, 75 μm microcells will be used.

A direct optical coupling (i.e., preferably without diffusing sheets) between the blocks (1) and the photosensors, preferably via, for example, a very thin layer of grease, optical silicone or optical clear adhesive (OCA) sheets, among others, having an intermediate refractive index (for example, equal to or greater than 1.5) between the scintillation crystal block (1) and the input surface of the photosensors.

One or more reflective films (8), covering all the side surfaces of the block or blocks (1) or disposed between contiguous scintillation crystal sheets (3), preferably completely covering or passing over not only the crystal block (1), but also the transverse region of the corresponding array (2) of photosensors.

The associated electronics which allows the depth of interaction in the crystal block (1), in addition to the energy of the gamma ray and the position of its interaction in said crystal block (1), to be calculated from the distribution of scintillation light, as well as the instant in time of the interaction to be calculated. The electronics will add up all the pixels of photosensors from each row and each column of the array (2) to provide information about the point of impact of the gamma ray in directions x and y, and to obtain information about the depth of interaction. The sum of all the pixels of each block (1) is also used to obtain information about the instant in time the gamma ray impacted.

Different embodiments of the present invention corresponding to various configurations of scintillation crystal blocks (1) are described below.

Embodiment 1

Block (1) made up of scintillation crystal sheets (3) optically isolated from one another and having a width smaller than that of the photosensors.

Figure 1C:
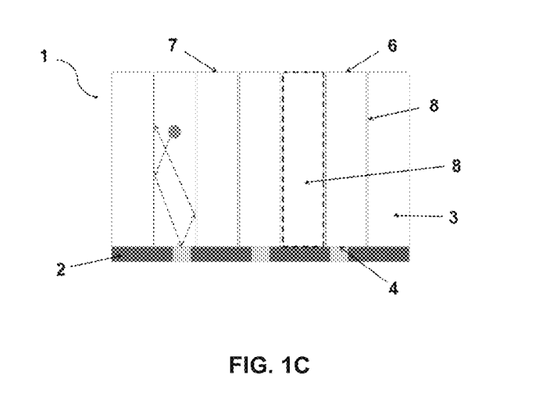
FIG. 1C. Detail of the path of a ray of light, inside a detection block according to the invention.

In a first configuration, the scintillation crystal block (1) is made up of several vertical sheets (3), in the form of a rectangular prism or truncated wedge, joined together by their largest sides, and joined to the array (2) of photosensors, by means of optical coupling, by one of their two longest and thinnest sides, as illustrated in FIGS. 1A-1C. The different sheets (3) are separated from one another by means of a reflective thin film (8), by means of air or by a clear adhesive having a low refractive index, in order to optically isolate or minimise the passage of scintillation light from one sheet (3) to another.

Given that the crystal sheets (3) have a smaller width than the array (2) of photosensors, as shown in FIG. 1A, the detection process in the device is performed by means of the distribution of light between several photosensors, as will be seen below. If the desirable condition that all the sheets (3) must have the same width is imposed, it is possible to easily distinguish the sheet (3) where interaction of the gamma ray occurred, without any problems of identification, for example, if the number of sheets is equal to 2N−1 or less, N being the number of photosensors in direction X (perpendicular to the sheets (3)).

In the preceding configuration, the internal separating surfaces between rectangular sheets (3) are preferably completely coated by the reflective films (8) (for example, with ESR), in such a way that the distribution of light is unique for each sheet (3), so the sheet (3) where the impact occurred can be easily distinguished.

The position along the sheet (3) and the depth of interaction of the gamma ray can be deduced by means of the distribution of light between the different photosensors along the sheet (3).

Embodiment 2

Block (1) consisting of vertical sheets (3), with a distribution of light among several photosensors, by means of one or more side windows (9) close to the photosensors.

Figure 4:
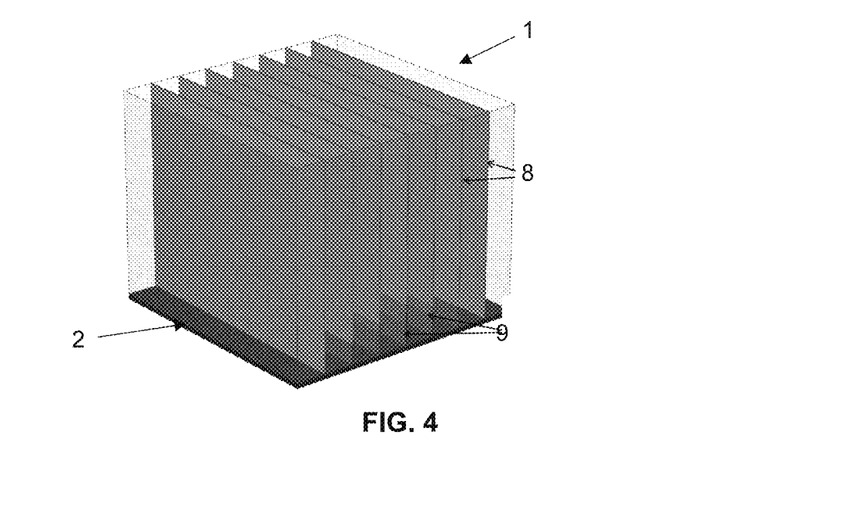
FIG. 4. Depiction of an array of scintillation sheets, with the separating film between internal sheets of the block being reflective. This film covers the entire height of the sheets at the edges, but decreases for the sheets in the centre, therefore having side windows.

This embodiment allows an even higher degree of packing of the sheets (3) to be obtained, partially allowing the light to pass from one sheet (3) to its adjacent sheet (as shown in FIG. 4).

In said second embodiment, the scintillation crystal block (1) is formed by joining vertical sheets (3) together, wherein each of the largest side surfaces of said sheets (3) is completely or partially optically isolated from adjacent sheets by means of a reflective thin film (8) (for example, an ESR film), air or by a clear adhesive having a low refractive index, completely covering the surface between some adjacent sheets (3), but leaving one or more side windows (9) open, allowing light to pass between said sheets (3). The part of the sheet (3) which is not optically isolated is preferably in a region close to the array (2) of photosensors, where it may be stuck to the adjacent sheet (3) by means of a clear adhesive having a high refractive index (such as Meltmount for example), preferably greater than 1.5, to allow light to easily pass to said adjacent sheet (3), as illustrated in said FIG. 4.

The scintillation crystal sheets (3) of the two ends of the block (1) are preferably optically isolated from contiguous sheets (3) for the purpose of preventing the passage of light to said adjacent sheets (3) or from other blocks (1). The other sheets (3) are not necessarily completely isolated for the identification of the sheet (3) where the impact of the gamma ray occurred by means of the distribution of light. This configuration can improve spatial resolution in direction (x), by including more sheets having a smaller thickness that can be identified in the same space. In a preferred embodiment of the invention, the more the distribution of sheets (3) advances towards a central region of the block (1), the greater the area of the window (9) not covered by the optical reflective film (8). When seen from the narrowest side of the reflective films (8), said films are seen as lines, the lower ends of which are distributed discretely, forming an arc (see FIG. 4). Alternatively, instead of crystal sheets (3) which are joined together, it is possible to use a single scintillation crystal monolithic block (1) in which notches (partial separations) are made, for example, by means of a laser. From a technical point of view, this solution is considered equivalent to the solution provided by sheets (3) manufactured independently but joined together forming the block (1) in a block according to the invention.

Embodiment 3

Block (1) consisting of vertical sheets (3) optically coupled to one another.

Figure 5:
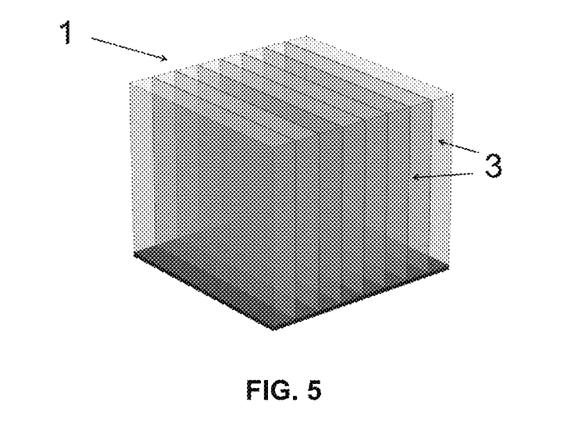
FIG. 5. Depiction of the array of scintillation crystal sheets coupled to an array of photosensors, wherein the separating sheet between said sheets is made of a semi-transparent material.

In this embodiment, it is also possible to obtain a higher degree of packing of sheets (3) by completely joining (as shown in FIG. 5) each assembly of two or more of said sheets (3) by means of a clear adhesive having a high refractive index. Most of the light is therefore trapped in the sheet (3) where the impact occurred, said light being directed directly towards the array (2) of photosensors or towards the retroreflective element (6). In this case, however, the light is partially distributed between the two or more sheets (3) connected without optical isolation and this information, together with the depth of interaction (5), can be used to identify the sheet (3) where the impact occurred, improving spatial resolution in direction (x). In this configuration, is determined the depth of interaction (5) in the same way described above. Likewise, from this information and with the information about the distribution of light in the photosensors along direction (x), the sheet (3) where the impact occurred is determined. It must be considered that the distribution of charge in direction (x) varies not only based on the sheet (3) where the impact occurred, but also based on the depth of interaction (5).

Embodiment 4

Block (1) consisting of two different layers (3): a made up of vertical sheets (3) and the other one consisting of an auxiliary scintillation crystal element (10).

Figures 6A, 6B:
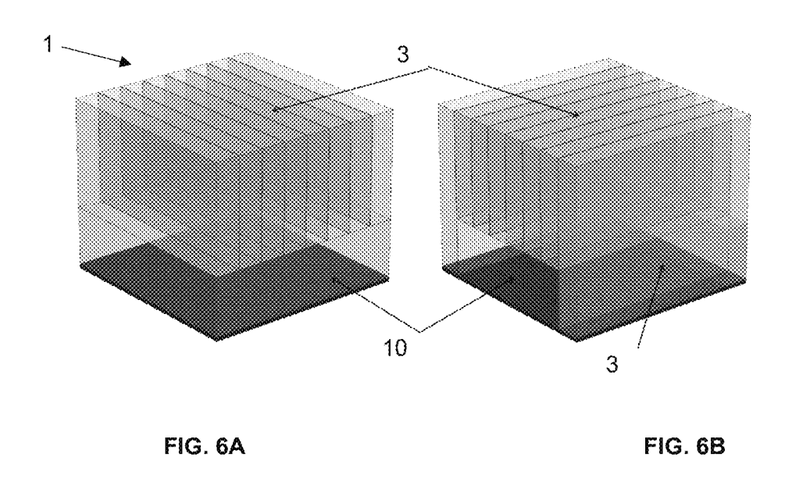
FIG. 6A. On the left, depiction of the design consisting of two layers, the first layer made of scintillation sheets and the second layer made of a block horizontal.
FIG. 6B. On the right, the side sheets come into contact with the photosensor.

In this fourth configuration, the block (1) comprises at least two different scintillation crystal structures: a first structure where gamma rays enter, made up of the joining together of vertical sheets (3), and a second structure consisting of at least one auxiliary scintillation crystal element (10), as illustrated in FIG. 6A. Said auxiliary scintillation crystal element (10) can adopt different forms, such as monolithic blocks, sheets or pixels, for example. The main dimension ($L_z$) of the auxiliary element (10) is smaller than the main dimension of the scintillation crystal sheets (3).

The different vertical sheets (3) are preferably separated from one another by means of a reflective thin film (8) (of the ESR type), by air or by a clear adhesive having a low refractive index, completely covering the surface between adjacent sheets (3), optically isolating same, in all these cases.

The auxiliary scintillation crystal element (10) is preferably adhered to the vertical sheets (3), for example by means of a clear adhesive having a high refractive index, to favour the complete transmission of light between the two scintillation crystal structures (3, 10).

In an alternative configuration, the vertical sheets (3) of the two ends of the block (1) are longer than the rest of the vertical sheets (3), in such a way that they are in direct contact with the photosensor (or coupled by means of optical grease or another material for optical coupling), as shown in FIG. 6B.

Embodiment 5

Block (1) consisting of two different structures: one structure made up of vertical sheets (3) in direction (y), and another structure having the same or a different thickness, also consisting of a plurality of auxiliary scintillation crystal elements (10) made up of vertical sheets in direction (x).

Figure 7:
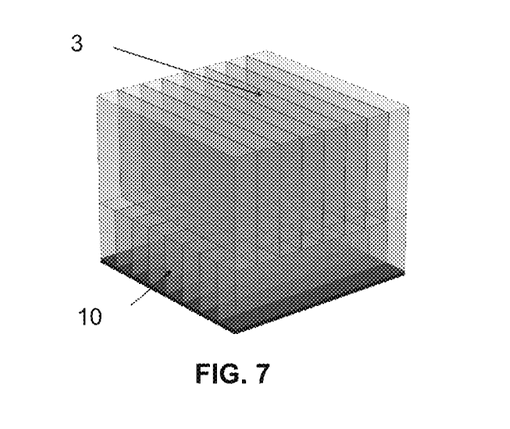
FIG. 7. Depiction of the approach consisting of two arrays of sheets oriented perpendicularly to one another. The thickness of one of the two layers is significantly less than that of the other.

In this fifth embodiment, the scintillation crystal block (1) consists of two different structures: a first structure where the gamma rays enter, made up of the joining together of vertical sheets (3) in direction (y), and a second structure having a smaller thickness consisting of the joining together of auxiliary scintillation crystal elements (10), made up of vertical sheets in direction (x), as illustrated in FIG. 7. Both structures are adhered to one another by means of a clear adhesive having a high refractive index to favour the complete transmission of light between the mentioned structures. The sheets of both structures are optically isolated from their adjacent sheets by means of reflective thin films (8) (of the ESR type), by air or by a clear adhesive having a low refractive index.

In this configuration, the depth of interaction (5) is mainly determined by the distribution of light in the first structure (direction (y)). The fundamental purpose of the structure that is the least thick is to effectively reduce the thickness of the thickest structure and therefore improve the spatial resolution in (x) and (y). Said resolution is worse for large thicknesses, since it increases the point spread function (PSF). It can easily be distinguished if the impact occurred in one structure or the other, since the distribution of light is perpendicular in both cases. This feature is critical for calibrating the energy of the gamma rays and, thus, for distinguishing impacts produced by means of the photoelectric effect in the scintillation crystal from impacts originating from Compton interactions (both in the body or object to be examined and in the crystal itself). Alternatively, the structure consisting of auxiliary scintillation crystal elements (10) can be thicker than the structure consisting of the main sheets (3).

Embodiment 6

Figure 8:
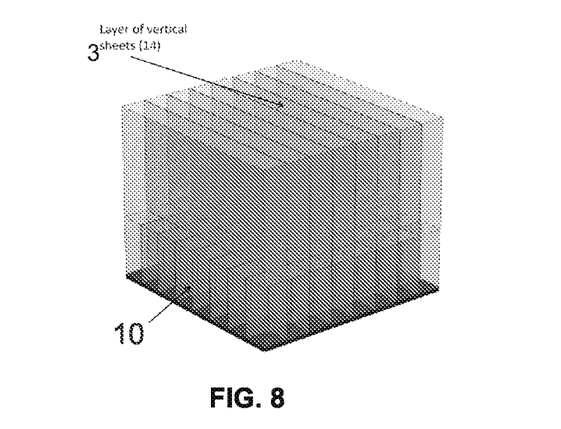
FIG. 8. Depiction of the design consisting of an array of sheets and a set of pixels. The thickness of the layer consisting of the set of pixels is significantly less than the sheets.

Block (1) consisting of two different structures: one structure made up of sheets (3) and another structure consisting of a plurality of pixels (that is, square-section scintillation crystal blocks disposed forming an array), by way of auxiliary elements (10). The first structure, where the gamma rays enter, is made up of the joining together of vertical sheets (3) in direction (y), and the second structure consists of the mentioned pixels, as illustrated in FIG. 8. Both structures are preferably adhered to one another for example by means of a clear adhesive having a high refractive index to favour the complete transmission of light between the mentioned structures.

In this configuration, the depth of interaction is mainly determined by the distribution of light in the first layer (direction (y)). The fundamental purpose of the structure that is the least thick is to effectively reduce the thickness of the thickest layer and therefore improve the spatial resolution in (x) and (y). Said resolution is worse for large thicknesses, since it increases the PSF. Alternatively, the auxiliary structure (10) that is the least thick consisting of pixels can be located first, where the gamma rays enter, and the one that is the thickest consisting of sheets (3) is therefore located immediately before the array (2) of photosensors.

Embodiment 7

Block (1) consisting of sheets (3) which are in turn are sub-divided by pixels (11).

Figure 9:
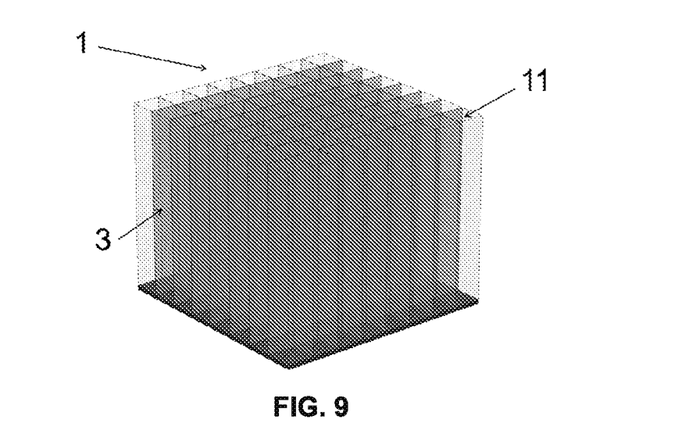
FIG. 9. Depiction of the proposal consisting of an array of pixels in which, in one direction and way, there are reflective walls and, in the other, semi-transparent walls.

In a seventh embodiment, the scintillation crystal block (1) is made up of the joining together of sheets (3) which in turn consist of pixels (11), as illustrated in FIG. 9. The sheets (3) are preferably optically isolated from one another by means of reflective thin films (8) (of the ESR type), by air or by a clear adhesive having a low refractive index. The pixels (11) in turn are joined together by air or by optical couplings (OCA, silicone, grease, etc.) the refractive index of which is less than that of the crystal, in order to allow the passage of light only partially from one pixel (11) to another. In this configuration, the position in directions (x, y) is fundamentally determined by the pixel (11) where the impact of the gamma ray occurred. The depth of interaction (5) is provided by the characteristic distribution of light between the different photosensors along the sheet (3) where the impact occurred.

Lastly, with respect to the specific applications of the present invention, a particular object thereof relates to the use of the devices described above in developing a positron emission tomography scanner, which allows the parallax error to be reduced considerably, and in developing a gamma camera.

A further object of the present invention is the use of the device described above in developing a particle physics and/or astrophysics detector.

A further object of the present invention is the design of a detection block (1) for a small animal PET scanner. In PET scanners used to conduct studies with small experimental animals, a very high spatial resolution is required to distinguish the small structures having a size of the order of a millimetre in the organs of mice and rats fundamentally. Moreover, given that it is appropriate to position the detectors close to the animal to increase sensitivity, and, moreover, the PET scanner requires being installed within the confined space of the opening of an MRI if simultaneous PET and MRI images are to be obtained, it is critical to obtain good information about the depth of interaction (5) for the purpose of reducing the parallax error.

Figure 10:
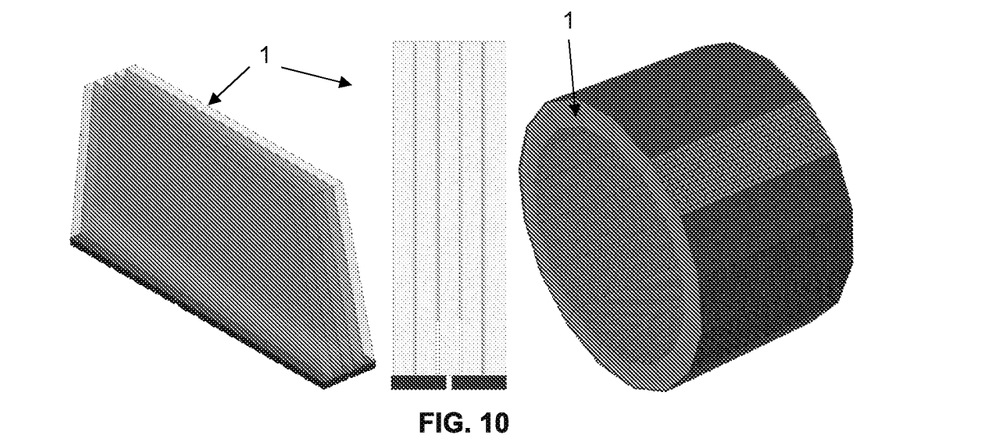
FIG. 10. Depiction of a PET scanner for small animals. From left to right: detail of a block consisting of 2×12 SiPM and 5 truncated scintillation sheets; detail of the profile of the 5 sheets where some of the side walls do not reach the array of photosensors; and the assembly of a PET system based on scintillation crystal blocks, with an approximate field of view of 110 mm in diameter and 100 mm axial.
Figure 11:
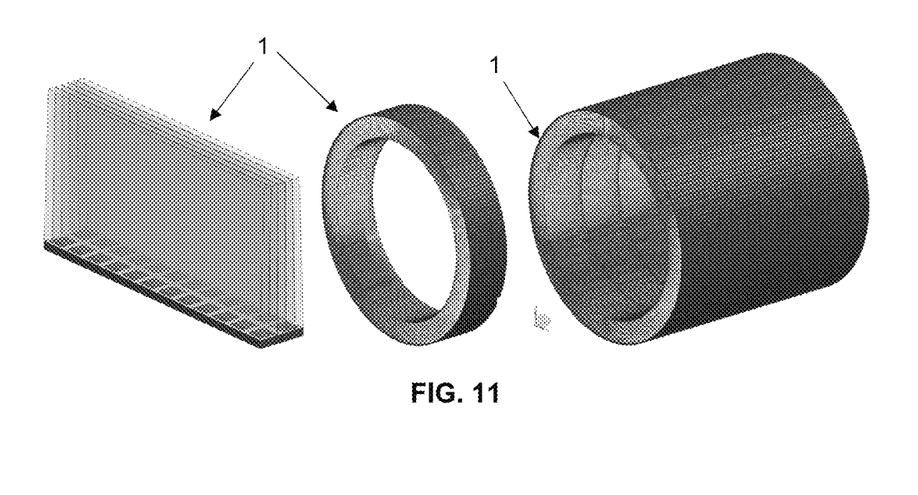
FIG. 11. Depiction of a PET scanner for small animals. From left to right: detail of the block consisting of 5 scintillation sheets parallel to the axial length of the scanner, with a light input size smaller than the output size so as to increase sensitivity, and showing the detail of the reflective grid around the array of photosensors; example of a ring measuring 25 mm in axial length and about 110 mm in opening; extension of the embodiment of a scanner to 100 mm in axial length.
Figure 12:
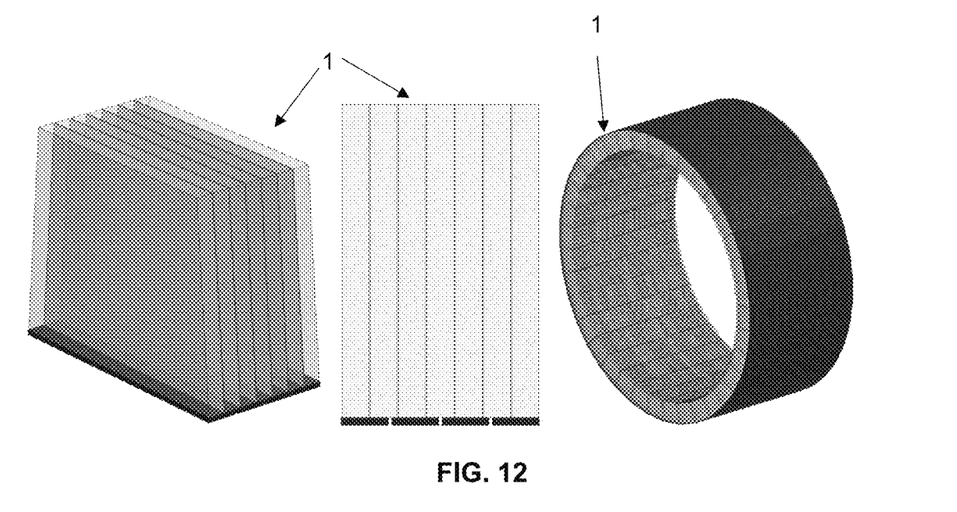
FIG. 12. Depiction of a PET scanner for the human brain. From left to right: detail of a block consisting of 4×8 SiPM and 7 truncated scintillation sheets; detail of the profile of the 7 sheets; and diagram for the assembly of the blocks forming a ring of about 250 mm in diameter and 150 mm in axial field.

For this case, in a preferred exemplary embodiment, a configuration is chosen in which the array (2) of photosensors of the block (1) consists of 2×12 photosensors having an area of 2×2 mm$^2$ each and five sheets (3) having approximate dimensions of 0.84×12×26.2 mm$^3$ are arranged. The sheets (3) are in the form of a truncated wedge to completely cover the transverse plane of the scanner with scintillation crystal and thus maximise sensitivity of gamma ray coincidence detection.

The two sheets (3) on the ends are completely isolated from the rest by means of ESR sheets. The central sheet (3) is also covered by a very fine ESR sheet, except for at 1-2 mm from the array (2) of photosensors, where it is in optical contact with its two neighbouring sheets (3), via a clear adhesive having a high refractive index (see FIG. 10). Alternatively, instead of crystal sheets (3) which are joined together, it is possible to use a single scintillation crystal monolithic block (1) in which notches (partial separations) are made, for example, by means of a laser.

In this case, a resolution in dimension (x) (perpendicular to the sheets) of around 0.58 mm, i.e., of the physical limit imposed by the mean free path of the positron before being annihilated with an electron is expected. A resolution in dimension (y) (along the main axis of the sheets (3)) of around 0.7 mm is expected, and a resolution in the DOI (5) of less than 2 mm is expected. Moreover, the resolution in time-of-flight is less than 200 ps FWHM.

The PET scanner can have two different configurations, according to the direction of the main axis of the truncated wedge of the sheets: a) the main axis of the sheets (3) is in the transverse plane of the scanner (FIG. 10): in this case, the scanner has around sixteen blocks (1) in the transverse plane; b) the main axis of the sheets (3) is in the axial plane of the scanner (FIG. 11), in this case the scanner has around one hundred and ninety-two (16×20) blocks (1) in the transverse plane.

A further object of the present invention relates to the design of the detection block (1) for a PET brain or full-body scanner.

In dedicated PET brain scanners, very good spatial resolution and good resolution in the depth of interaction (5) are required, and at the same time, very good temporal resolution is required to increase the signal-to-noise ratio. In the case of a full-body PET scanner, in addition to the very good spatial and temporal resolution, certain resolution in the depth of interaction (5) is also needed to prevent the parallax error due to events in which the two gamma rays are emitted at large angles with respect to the transverse plane of the scanner. Unlike full-body scanners today (which have axial coverages of 15-25 cm), these events are common in the case of full-body PET scanners with axial coverages equal to or greater than 70 cm.

For this case, a configuration is chosen in which the array (2) of photosensors of the block (1) consists of 4×8 photosensors having an area of 3×3 mm$^2$ each, and seven sheets having dimensions of 1.8×20×25.4 mm$^3$ (FIG. 12) are arranged. The sheets (3) are in the form of a truncated wedge to completely cover the transverse plane of the scanner with scintillation crystal and thus maximise the sensitivity of gamma ray coincidence detection. All the sheets (3) are completely isolated from the rest by means of ESR sheets. However, it is possible to distinguish in which sheet (3) the impact occurred given that all of them have a unique distribution of light with respect to the array (2) of photosensors.

The invention claimed is:

1. A device for the detection of gamma rays, comprising a plurality of scintillation crystal detection blocks disposed on an array of photosensors, wherein said array comprises a plurality of rows and a plurality of columns, and wherein said detection blocks:

comprise a plurality of elongated scintillation crystal sheets, in the form of rectangular prisms or truncated wedges, which are disposed consecutively on said array of photosensors, wherein said scintillation crystal sheets define a gamma ray input region and a scintillation light output region, in such a way that the scintillation light can be detected by the array of photosensors;

are optically isolated, in such a way that the scintillation light can only exit said blocks via the output region;

wherein the scintillation crystal detection blocks and the array of photosensors are disposed in direct optical coupling;

and wherein the detection device comprises an electronic component connected to the array of photosensors, configured to record the reading information from said photosensors, and to process and/or analyse said information;

said device being characterised in that:

the array of photosensors is at least partially disposed such that it is shared between said detection blocks, and the electronic component connected to the array are configured to record a plurality of integrated detection signals, corresponding to the sum of signals generated by each row and by each column of the array of photosensors, and to record a set of timestamps associated with each of the integrated detection signals along an axis formed by the disposition of detection blocks.

2. The device according to claim 1, wherein the gamma ray input region is completely covered by a retroreflective sheet or an ESR sheet.

3. The device according to claim 1, wherein the array of photosensors comprises a dead zone covered by a reflective grid.

4. The device according to claim 1, further comprising one or more reflective films disposed between the consecutive scintillation crystal sheets.

5. The device according to claim 4, wherein the number of scintillation crystal sheets is substantially equal to 2N−1, N being the number of photosensors in a direction perpendicular to the scintillation crystal sheets.

6. The device according to claim 4, wherein the reflective films are prolonged beyond the scintillation crystal block, partially or completely going through the array of photosensors.

7. The device according to claim 4, wherein one or more of the reflective films comprise optically transparent side windows, disposed in regions close to the scintillation light output region.

8. The device according to claim 7, comprising a plurality of reflective films equipped with side windows, disposed in series between consecutive scintillation crystal sheets, in such a way that said side windows form an arc geometry.

9. The device according to claim 1, wherein two or more scintillation crystal sheets are joined together by a clear adhesive having a refractive index greater than 1.5.

10. The device according to claim 1, further comprising one or more auxiliary scintillation crystal elements disposed in the blocks between the scintillation crystal sheets and the array of photosensors, or on the scintillation crystal sheets in the gamma ray input region.

11. The device according to claim 10, wherein the auxiliary scintillation crystal elements comprise monolithic blocks, sheets disposed perpendicularly to the scintillation crystal sheets or pixels, wherein the main dimension of said auxiliary elements is less than the main dimension of the scintillation crystal sheets.

12. The device according to claim 1, wherein the scintillation crystal sheets are sub-divided as a plurality of pixels.

13. The device according to claim 1, wherein the array of photosensors comprises a plurality of silicon photomultipliers (SiPM), and wherein each element photosensor of the array has a number of microcells of at least twice the number of scintillation optical photons expected by each of said photosensors.

14. A system for the detection of gamma rays, comprising one or more devices according to claim 1, integrated in a ring or facing plane detection structure of a positron emission tomography camera, a gamma camera, of a particle physics and/or astrophysics detector, or of an animal PET scanner.

15. A method for the detection of gamma rays, where the method comprises performing the following steps using a device according to claim 1:

recording, with the electronic component connected to the array of photosensors, a plurality of integrated detection signals, corresponding to the sum of signals generated by each row and by each column of the array of photosensors of said device;

recording, with electronic component connected to the array of photosensors, a set of timestamps associated with each of the integrated detection signals along an axis formed by the disposition of detection blocks; and determining, with the mentioned electronic component, the impact time of the gamma rays in the detection blocks, the impact energy of the gamma rays, the projection of the position of said impact on the array of photosensors and/or the depth of interaction of said gamma rays from the integrated detection signals and their corresponding timestamps.

* * * * *